July 23, 1963
G. L. CLAPPER
3,098,999
VOLTAGE MONITOR SYSTEM
Filed Dec. 11, 1958
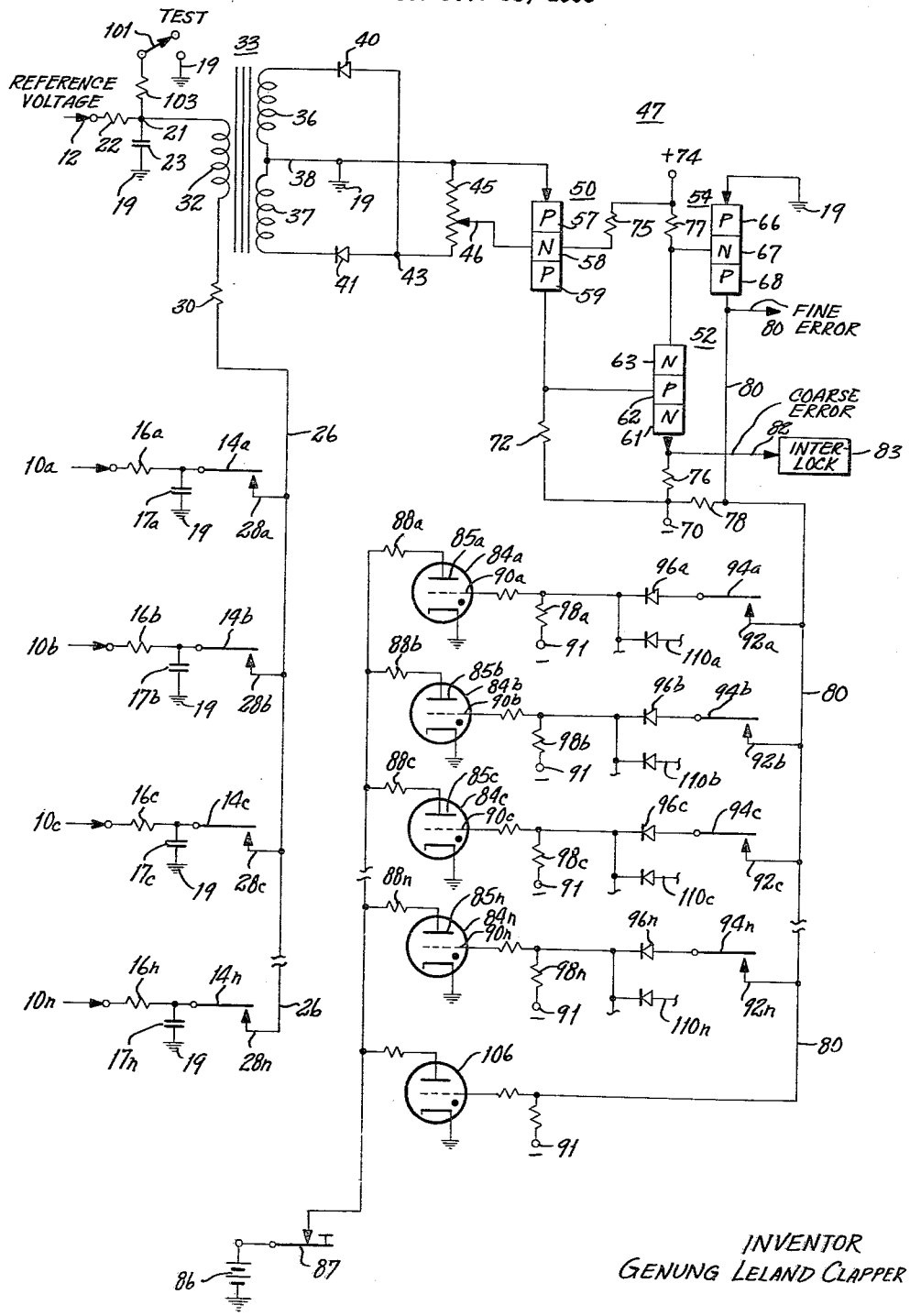
INVENTOR
GENUNG LELAND CLAPPER
BY Darby & Darby
ATTORNEYS

United States Patent Office 3,098,999
Patented July 23, 1963

3,098,999
VOLTAGE MONITOR SYSTEM
Genung Leland Clapper, Vestal, N.Y., assignor to International Business Machines Corporation, New York, N.Y., a corporation of New York
Filed Dec. 11, 1958, Ser. No. 779,737
2 Claims. (Cl. 340—248)

This invention relates to a voltage monitor system and more particularly to a system which is capable of monitoring and comparing the voltage present at a single point, or a number of points, of each of a plurality of locations with a reference voltage and providing an indication of the location and particular point at which the monitored voltage differs from the reference voltage and a further indication of the magnitude of the difference.

It is often desirable to monitor the voltage present at different locations in a complex electronic system and to compare its magnitude with the magnitude of a reference voltage. Once this comparison has taken place, it is then desirable to provide an indication of any location where the magnitude of the voltage present differs from the magnitude of the reference voltage. Each of the locations being monitored may have either a single or a plurality of voltage points to be checked. One example of an environment where such monitoring would be desirable would be in a complex digital computer where there are a number of locations at which voltage levels of the same magnitude are present. A system which could perform this type of monitoring and checking would also have utility in a variety of electrical systems.

The present invention provides a system for monitoring the voltages present at a plurality of locations and comparing their magnitudes with a reference voltage. In accordance with the operation of the invention, an error voltage is generated as a result of the voltage monitored at a particular location differing from the reference voltage. The magnitude of the error signal is dependent upon the difference in potential between the two voltages. The error signal produced by the comparison is then amplified in a novel sense amplifier which is capable of producing two distinct levels of output signal corresponding to an error signal of small magnitude called the "fine error" and an error signal of larger magnitude called the "coarse error." Provisions are made whereby the coarse error signal, which is representative of a relatively large difference between the magnitude of the voltage at the location and the reference voltage, is used to disable or shut-down the circuits which produce the voltage for the various locations. An indicator circuit is also provided to indicate the specific location which caused the error signal, either coarse or fine. The monitoring system of the present invention also provides a test circuit by means of which an error signal is generated when each of the locations is checked. The test circuit enables a check to be made of the indicator circuit.

It is therefore an object of this invention to provide a voltage monitoring system which is capable of monitoring the voltages at a plurality of locations.

Another object of this invention is to provide a voltage monitoring system in which the voltage present at a plurality of locations is sequentially compared with a reference voltage and an error signal is produced when the comparison shows a discrepancy.

It is still another object of this invention to provide a voltage monitoring system which is capable of monitoring the voltages present at a plurality of locations and producing an indication of the particular location at which the voltage monitored differs from a reference voltage.

Yet another object of the invention is o provide a voltage monitoring system which utilizes a nvel sense amplifier which is capable of producing a plurality of separate output signals in accordance with the magnitude of the error signal which is produced as a result of the comparison of a monitored voltage with a reference voltage.

Other objects of the invention will be pointed out in the following description and claims and illustrated in the accompanying drawing, which discloses, by way of example, the principle of the invention and the best mode, which has been contemplated, of applying that principle.

Referring to the drawing, a plurality of locations $10a$, $10b$, $10c$, ... $10n$ are shown. Each of the locations $10a$, ... $10n$ is representative of a point in a complex electronic system at which a voltage of substantially the same magnitude is present. It is the magnitudes of these voltages which are to be periodically checked against a reference voltage. The locations $10a$, ... $10n$ may, for example, represent the input or output circuits of a series of direct current amplifiers, or the outputs of a plurality of bistable circuits, or any other environment where the voltage present at a pluality of locations is to be tested. As illustrated, only a single point is to be monitored at each of the locations $10a$, ... $10n$. It should be realized that the system may be expanded to monitor a plurality of points at each of the locations $10a$, ... $10n$, as will later be explained.

The voltage present at each of the locations $10a$, ... $10n$ is to be compared with a reference voltage 12 which is preferably supplied from a variable potential source (not shown). The potential source for the reference potential 12 is preferably variable in order to make the monitoring system more flexible in the range of operation. Each of the locations $10a$, ... $10n$ is connected to a respective movable contact $14a$, $14b$, $14c$ ... $14n$, of a relay or distributor type device (not shown) by means of an integrating network formed by the respective resistors $16a$, $16b$, $16c$, ... $16n$ and capacitors $17a$, $17b$, $17c$ ... $17n$. The lower ends of capacitor $17a$, $17b$, $17c$ ... $17n$, are connected to a source of common reference potential, such as ground 19. The integrating networks formed by resistors 16 and capacitors 17 are used to provide filtering and averaging for the voltages being monitored. The time constant of the integrating network is short enough, however, so that D.C. ripple voltages present at the locations $10a$ ... $10n$ will be detected.

The reference voltage 12 is supplied through a resistor 22 to a junction point 21 where the comparison of the voltage monitored at the various locations $10a$ ... $10n$ and the reference voltage 12 is accomplished. A capacitor 23 is connected between the junction point 21 and ground 19 in order to filter the reference voltage 12.

Each of the locations $10a$, $10b$, $10c$ ... $10n$ is sequentially connected to a common line 26 by means of the stationary contact points $28a$, $28b$, $28c$ ... $28n$ of the relay or distributor device. For the remainder of the specification the use of a distributor device is assumed, but it should be realized that any equivalent type of device may be used. The distributor device sequentially makes and breaks contact between the movable contacts 14a, 14b, 14c ... 14n and the stationary contact points 28a, 28b, 28c ... 28n thereby sequentially applying the voltage present at the locations 10a, 10b, 10c ... 10n to the line 26. The line 26 is in turn connected to the voltage comparison junction point by means of resistor 30 and through the primary winding 32 of a pulse transformer 33. In this manner, the voltages present at the various locations 10a ... 10n are sequentially applied to the junction point 21 for comparison with the reference voltage 12 for the time that the respective movable contact 14a ... 14n makes contact with the stationary contact point 28a ... 28n. If the voltage monitored at any of the locations 10a ... 10n differs from the reference voltage 12, a voltage pulse is produced in the primary winding 32 of the pulse transformer 33. The voltage at a respective location may vary from its ideal value, which is approximately equal to the reference voltage 12, due to component aging or failure, variation in the location supply voltage or any of a number of other reasons. The voltage pulse which is formed has a time duration which is equal to the period of contact between the contact points 14 and 28 and a magnitude which is equal to the difference in voltage between the reference voltage 12 and the voltage at the particular location being monitored. If the voltage monitored at a respective location 10a ... 10n is substantially equal to the reference voltage 12, no pulse is produced in the primary 32 of the transformer 33 and the remainder of the system will not function.

When a pulse indicative of a difference between the voltage at a respective location 10a ... 10n and the reference voltage 12 is generated in the primary winding 32 of the transformer 33, a corresponding pulse is induced in the secondary of the transformer 33. The secondary of the transformer 33 comprises two windings, an upper winding 36 and a lower winding 37, and a center tap 38 which is connected from the junction of the two windings 36 and 37 to ground 19. As is well known, this configuration of the transformer secondary produces pulses of opposite polarity at the upper end of the upper winding 36 and at the lower end of the lower winding 37 in response to a pulse in the primary winding 32.

Connected to the upper end of the upper winding 36 and the lower end of the lower winding 37 are the cathodes of the respective diodes 40 and 41. As poled, the diodes 40 and 41 will pass only negative pulses and will not pass positive pulses. The negative pulses which are passed by the diodes 40 and 41 are applied to one end terminal 43 of a potentiometer 45. The other terminal of potentiometer 45 is connected to ground 19. The error signal which results from the comparison of the monitored voltage with the reference voltage is developed across the potentiometer 45 which is used as a sensitivity control for the monitoring system.

To illustrate the operation of the transformer 33 and its associated diodes 40 and 41, two cases are considered. In the first case, consider that a voltage is present at one of the locations 10a ... 10n which differs from the reference voltage 12 in such a manner so that a positive pulse is produced in the primary winding 32, that is, the upper end of the primary winding 32 assumes a positive polarity with respect to the lower end. This type of pulse, in turn, induces a positive polarity pulse in the secondary of the transformer 33 between the upper end of the upper winding 36, and ground 19. A negative pulse is produced between the lower end of the lower winding 37 and ground 19. As previously explained the diodes 40 and 41 are so poled that they pass only negative pulses. In this instance, the negative pulse present at the lower end of the lower winding 37 is passed by the diode 41 to the terminal 43 of the potentiometer 45.

In the second case, consider a voltage present at one of the locations 10a ... 10n which differs from the reference voltage 12 in such a manner so that a negative pulse is produced in the primary winding 32, that is, the upper end of the primary winding 32 assumes a negative polarity with respect to the lower end. This negative pulse in turn causes a negative pulse to be present between the upper end of the upper winding 36 and ground 19. This negative pulse is passed through the diode 40 to the terminal 43 of the potentiometer 45.

As shown in the drawing, the circuit is arranged to change pulses of any polarity, which are produced in the primary winding 32 of the transformer 33, into an error signal of negative polarity at the terminal 43 of the potentiometer 45. As an alternative arrangement, an error signal may be produced at the terminal 43 in response to only a positive or a negative pulse in the primary winding 32 of the transformer 33. In the former case, the diode 40 is not connected to the terminal 43 and the upper winding 36 may be eliminated, if desired. In the latter case, the diode 41 is not connected to the terminal 43 and the lower winding 37 may be eliminated, if desired.

Separate indications of a high or low voltage condition may be had by connecting the diodes 40 and 41 to different sensitivity controls and amplifier systems.

A portion of the voltage which is impressed across potentiometer 45 between the terminal 43 and ground 19 is supplied to a sense amplifier 47 by means of the variable arm 46 of the potentiometer 45. The function of sense amplifier 47 is to produce two distinct output signals which are indicative of whether the error signal formed as a result of the voltage comparison at junction point 21 is of a high order or low order magnitude, that is, a large or a small difference between the voltage monitored from a location 10a ... 10n and the reference voltage 12.

As shown, the sense amplifier 47 is a three stage, direct coupled amplifier consisting of the three transistor amplifiers 50, 52 and 54. The transistor amplifier 50 is illustratively and schematically shown as being of the PNP type and having an emitter electrode 57, a base electrode 58, and a collector electrode 59. Transistor amplifier 52 is illustratively and schematically shown as being of the NPN type and having an emitter electrode 61, a base electrode 62 and a collector electrode 63. The transistor amplifier 54 is of the same PNP type as the transistor amplifier 50 and has an emitter electrode 66, a base electrode 67 and a collector electrode 68. While the invention is described as using PNP type transistors for the amplifiers 50 and 54 and an NPN type transistor for the amplifier 52, it should be realized that any suitable type transistor may be used for the respective amplifiers upon the application of proper polarity signal and biasing voltages to it.

Transistor amplifier 50 is connected as a grounded emitter amplifier. The emitter electrode 57 is connected to ground 19 and a reverse bias voltage is applied to the collector electrode 59 from a suitable source of negative potential 70 by means of a resistor 72. A positive bias voltage is applied to the base electrode 58 from a suitable source of positive potential 74 by means of a resistor 75. When the pulse of negative polarity error signal is applied from the center arm 46 of the potentiometer 45 to the base electrode 58 the positive bias voltage on the base electrode 58 is overcome and "hole" current flow is established between the base electrode 58 and the collector electrode 59. The negative pulse error signal applied to the base electrode 58 from the potentiometer 45 center arm 46 is inverted and appears at the collector electrode 59 as a positive pulse. This positive pulse also appears at the base electrode 62 of the transistor amplifier 52 which is directly coupled to the collector electrode 59 of the transistor amplifier 50. The transistor amplifier 52 is connected as a common emitter amplifier. The emitter electrode 61 is supplied with a forward bias voltage from the negative potential source 70 by means of a resistor 76. A reverse bias is established on the collector electrode 63 from the positive potential source 74 by means of a resistor 77. The resistor 76 in the emitter circuit of the transistor 52 also functions to provide degeneration for temperature and gain stability.

The positive pulse signal applied to the base electrode 62 of the transistor 52 is inverted at the collector electrode 63 and is applied to the base electrode 67 of the transistor 54. The transistor 54 is connected as a grounded emitter amplifier and has its emitter electrode 66 connected to ground 19. A reverse bias is supplied to the collector electrode 68 from the negative potential source 70, by means of a resistor 78. The transistor 54 is biased beyond cutoff by means of the positive potential supplied from the positive potential source 74 to the base electrode 66 through the resistor 77. When the negative going output pulse of the transistor 52 is of a small magnitude, it is linearly amplified by the transistor 54 and appears across resistor 78 as a positive going output pulse on output line 80 which is connected to the collector electrode 68. The output signal on line 80 is called the "fine error signal" since it is indicative of only a small error in the comparison of the two voltages at junction point 21. When the negative output signal at the collector electrode 63 of the transistor amplifier 52 is of a large magnitude, transistor 54 saturates and the collector electrode 63 of the transistor 52 is effectively grounded through the current path formed by the base electrode 67 and the emitter electrode 66 of the transistor 54. In this case, transistor 52 functions as an emitter follower driver and a signal is produced on line 82. The signal on line 82 is called the "coarse error signal" since it is indicative of a large discrepancy in the comparison of the two voltages at junction point 21.

Therefore it is seen that an error signal of small magnitude produced at the terminal 43 causes the sense amplifier 47 to function as a direct coupled amplifier with complementary symmetry and degeneration for temperature and gain stability. When a signal of a large magnitude appears at the terminal 43, transistor 50 continues to function as an amplifier, but since the transistor 54 saturates, transistor 52 now functions as an emitter follower. By adjusting the center arm 46 on the potentiometer 45 the sensitivity of the sense amplifier 47 may be adjusted for individual voltage tolerances. In this manner, only differences between the voltage levels present at the various locations 10a . . . 10n and the reference voltage 12, which are above a certain magnitude will cause the sense amplifier 47 to operate. The bias voltage applied to the base electrode 67 of the transistor 54 may be varied in order to determine the magnitude of error signal which is necessary to cause transistor 54 to saturate and therefore cause the production of the coarse error signal on line 82. This arrangement also provides a threhold to keep small error signals and noise from driving the transistor 54 to saturation.

Connected to the coarse error signal output line 82 is an interlock circuit 83. In a preferred form of the invention, it is desired to cut off the power which supplies the voltage to the various locations 10a . . . 10n when a coarse error signal, which is indicative of a large discrepancy between the voltage at a location and the reference voltage, is produced. This is done to prevent possible damage to the system by the abnormally high voltage. The block 83 may contain any suitable device which is capable of preventing the application of the voltages to the locations 10a . . . 10n. Suitable devices may be a relay, a voltage sensitive circuit breaker, etc., which are adjusted to operate only when the signal on line 82 is of a magnitude sufficient to be classified as a "coarse error." This occurs when transistor 52 is operated as an emitter-follower.

The sequential monitoring of the various locations 10a . . . 10n permits time sharing of the sense amplifier 47 and other circuitry. Since sequential monitoring is used, it is desirable to provide an indication which shows which location had the voltage which caused the production of the error voltage. This indication should be maintainable for a period of time which is at the control of the personnel who are going to clear the trouble which originally caused the error voltage to be produced. To accomplish this, the fine error output signal on line 80 is sequentially connected to an indicator circuit comprising a series of indicators 84a, 84b, 84c . . . 84n, which correspond to the locations 10a, 10b, 10c . . . 10n. The indicators 84a . . . 84n are preferably miniature thyratrons. As is well known, the thyratron is a gas-filled tube which gives off a visible glow when the gas inside the tube is ionized. The ionization of the gas molecules occurs when the thyratron is "fired" and is conducting.

As shown, each of the thyratrons 84a . . . 84n has a respective plate electrode 85a . . . 85n and a respective grid electrode 90a . . . 90n, which controls the firing of its respective thyratron. The plates 85a . . . 85n of the thyratron tubes 84a . . . 84n are connected to a source of positive potential represented by the battery 86 through a normally closed switch 87 and the respective resistors 88a, 88b, 88c . . . 88n. The positive potential source 86 is preferably separate from the positive potential source 74 so that the thyratrons will not be affected when the power to the system is disconnected by the operation of the interlock 83.

The firing of a thyratron tube occurs when the negative potential supplied from a separate negative potential source 91 to the grids 90a, 90b, 90c . . . 90n by means of the respective resistors 98a, 98b, 98c . . . 98n is overcome by the fine error signal present on line 80.

The fine error voltage is sequentially applied to the grids 90a, 90b, 90c . . . 90n by means of the stationary contact points 92a, 92b, 92c . . . 92n, which are connected to the line 80, and the movable contacts 94a, 94b, 94c . . . 94n which are connected to the grids of the thyratrons through diodes 96a, 96b, 96c . . . 96n. The movable contacts 94a . . . 94n are preferably connected to the distributor device which operates the movable contacts 14a . . . 14n in such a manner so that the contacts 92 and 94 close before the contacts 14 and 28. This insures that the error voltage will be applied to the thyratron grids during the full period of its production. If desired, the movable contacts 94a . . . 94n may be operated by a separate distributor device, if synchronized with 14a . . . 14n.

The diodes 96a . . . 96n are biased by connecting their respective cathodes to the negative potential source 91 through respective resistors 98a . . . 98n. A fine error signal on line 80 is of a sufficient positive polarity to overcome the negative bias on a diode 96 and be conducted to a grid 90 of a thyratron 84, thereby causing it to conduct. When one of the stationary contact points 92a . . . 92n is contacted by a corresponding movable contact 94a . . . 94n, and a fine error signal is present on line 80 during the period that the contact is made, the respective diode 96 which is connected to the line 80 during the period of contact will conduct and cause a signal to be placed on the grid 90 of the respective thyratron 84 to which it is connected. This signal causes the thyratron 84 to fire and present a visible indication to an observer. The particular thyratron 84a . . . 84n which is fired corresponds to a particular location 10a . . . 10n.

To illustrate the operation of the indicator circuit, assume for example that a voltage is monitored at location 10c which is of a different magnitude than the reference voltage 12. As previously explained, this generates an error signal at the center arm 46 of the potentiometer 45 which in turn, if the magnitude of the error signal is not too great, causes a signal to be produced only on the fine error output line 80. As location 10c is monitored by movable contact 14c, movable contact 94c, of the indicator circuit, is brought into contact with the fine error output line 80. The signal present on line 80 is conducted through diode 96c to the grid 90c of the thyratron 84c. This signal causes the thyratron 84c to fire and give off a visible gaseous glow. In this manner, an indication is provided of the location 10c which had the voltage which produced the error signal. Errors present in any of the other locations 10a . . . 10n would be manifested in the same manner as the indicator circuit. It will be understood that a large discrepancy in the comparison of the two voltages at junction point 21 will also effect operation of the indicator circuit since the development of a "coarse error signal" is always preceded by a "fine error signal" output on line 80.

Switch 87 is used to clear the thyratron, which was fired, after the trouble at the location which caused the production of the error voltage has been repaired. When switch 87 is depressed, the positive potential from the source 86 is removed from the plates 85a . . . 85c of all of the thyratrons 84a . . . 84c. Once the positive potential from the source 86 is removed, the conducting thyratron ceases to fire and the gaseous indication is no longer present.

A test switch 101 is provided in order to check the indicator circuit. When switch 101 is connected to ground 19 a voltage divider is formed by resistor 22 and a resistor 103, which is connected between junction point 21 and ground 19. The closing of the test switch 101 changes the magnitude of the reference voltage 12 at the junction point 21 and therefore when the correct voltage is monitored at the locations 10a . . . 10n an error signal is produced at the potentiometer center arm 46. This error signal causes the thyratrons 85a . . . 85n to sequentially fire in a manner which has been previously explained, and all of the thyratrons remain conducting until the clearing switch 87 is depressed. When the switch 101 is removed from the ground 19 position, the monitoring system is again ready to operate to monitor the location 10a . . . 10n.

Another indicator thyratron 106 is also connected to the fine error line 80. Thyratron 106 fires and gives a visible indication, any time a fine error signal appears on line 80. The indicator 106 is necessary when a plurality of voltage points at each of a plurality of locations are being monitored by a plurality of sense amplifiers similar to the sense amplifier 47. For example, if five separate voltage points are to be monitored at each of the respective locations 10a . . . 10n, there would be a movable contact, similar to contact 14, and stationary contact point, similar to contact point 28, for each of the voltage points at each location. The voltage present at corresponding points of the various locations should be of equal magnitude so that a single sense amplifier may be used for all of the corresponding points. However, it should be realized that the voltages present at each of the points at a particular location need not be equal since each of the sense amplifiers may be adjusted to compare a voltage of a different magnitude or polarity. A separate pulse transformer, and sense amplifier, five in this example, would be connected to each of the five contact points at a single location, for example, location 10a. The five pulse transformers and sense amplifiers would then be connected to the five voltage points at location 10b, and so on. In this manner, each of the voltage points at each location is monitored. Each of the plurality of voltage points at a respective location may be monitored simultaneously, or sequentially, as preferred.

The fine error output lines of each of the five sense amplifiers used is simultaneously connected to the grid 90a of indicator 85a, by means of the diodes 96a, 110a . . . etc., when the voltage points at location 10a are being monitored. As many diodes are connected to the grid 90a of the thyratron 84a as there are sense amplifiers. After the voltages at the five points at location 10a are monitored, the five transformers and sense amplifiers are switched from the five voltage points at location 10a to the corresponding five voltage points at location 10b. Just prior to this, the five fine error output lines are simultaneously connected to the thyratron 84b by means of the diodes 98b, 110b, . . . etc. This procedure is followed until all of the voltage points at all of the locations have been monitored.

Each of the sense amplifiers 47 also has an indicator tube, similar to thyratron 106 which is continuously connected to its fine error output line. When an error signal is produced by one of the voltage points at one of the locations, the particular voltage point is indicated by the firing of the indicator tube which is connected to the sense amplifier which is associated with the particular voltage point. The particular location of the error producing voltage is indicated by the firing of one of the thyratrons 85a . . . 85n. Utilizing this arrangement, the monitoring of an electronic system having thirty locations with five voltage points for each location, for a total of 150 voltage points, would require only thirty indicators 84, one for each of the thirty locations, and five indicators 106, one for each of the five voltage points at a location. In this manner, thirty-five indicators provide information for 150 separate points.

It is obvious to one skilled in the art that the system described may be extended for used with any number of locations with any number of voltage points in respective locations.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A system for monitoring the voltages present at a plurality of locations comprising means for sampling the voltages at the respective locations, a source of reference potential, means for producing an error voltage when the voltage sampled is not substantially equal to said reference potential, sense amplifier means connected to said last named means for measuring the magnitude of the error voltage, said sense amplifier comprising first, second and third transistor amplifiers, each of said transistor amplifiers having a respective emitter, base and collector electrode, means connecting the collector electrode of said first transistor to the base electrode of said second transistor, means connecting the collector electrode of said second transistor to the base electrode of said third transistor, means for supplying the error voltage to the base electrode of said first transistor, first output means connected to the collector electrode of said third transistor, said first, second and third transistors operating as substantially linear amplifiers in response to an error voltage of less than a predetermined magnitude and thereby producing an output signal at said first output means, and second output means connected to the emitter electrode of said second transistor, said third transistor being saturated by an error voltage of a magnitude greater than said predetermined magnitude and causing an output signal to be produced at said second output means, a plurality of indicators, each one of said indicators corresponding to a respective one of said locations, and means for connecting the indicator corresponding to the location whose voltage is being sampled to said first output means of said amplifier during the time the voltage is sampled, a respective indicator producing an indication which represents the location where the sampled voltage did not substantially equal the reference potential in response to an output signal at said first output means.

2. A monitoring system as set forth in claim 1 wherein means are connected to said second output means for removing the voltage from said locations in response to a signal at said second output.

References Cited in the file of this patent

UNITED STATES PATENTS

| | | |
|---|---|---|
| 2,130,443 | Willis | Sept. 20, 1938 |
| 2,407,361 | Wilson | Sept. 10, 1946 |
| 2,589,465 | Weiner | Mar. 18, 1952 |
| 2,645,765 | Bixby | July 14, 1953 |
| 2,696,604 | Markow et al. | Dec. 7, 1954 |
| 2,745,090 | | |
| 2,789,164 | | |
| 2,853,633 | | |
| 2,876,297 | | |
| 2,877,310 | | |
| 2,909,720 | | |
| 2,906,817 | | |
| 2,943,266 | | |
| 2,958,823 | | |
| 2,982,887 | | |
| | Grillo | May 8, 1956 |
| | Stanley | Apr. 16, 1957 |
| | McVey | Sept. 23, 1958 |
| | Keonjian | Mar. 3, 1959 |
| | Donald | Mar. 10, 1959 |
| | Fthenakis | Oct. 20, 1959 |
| | Kidd et al. | Sept. 29, 1959 |
| | Belland | June 28, 1960 |
| | Rabier | Nov. 1, 1960 |
| | Seeley | May 2, 1961 |